(12) United States Patent
Shafiee et al.

(10) Patent No.: US 9,070,113 B2
(45) Date of Patent: Jun. 30, 2015

(54) STOCK KEEPING UNITS FOR CONTENT PROCESSING

(75) Inventors: Mohammad Reza Shafiee, Ridgefield, CT (US); Satya S. Raju, Flower Mound, TX (US); Rajesh Chaganti, Flower Mound, TX (US); Ashutosh K. Sureka, Irving, TX (US); Michael J. Naggar, Dallas, TX (US); Prakash Maddipatla, Flower Mound, TX (US); Wei Liu, Flower Mound, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 613 days.

(21) Appl. No.: 12/971,005

(22) Filed: Dec. 17, 2010

(65) Prior Publication Data
US 2012/0158596 A1    Jun. 21, 2012

(51) Int. Cl.
G06F 9/46 (2006.01)
G06F 7/00 (2006.01)
G06Q 10/10 (2012.01)
G06F 9/48 (2006.01)
G06F 17/30 (2006.01)

(52) U.S. Cl.
CPC ........... *G06Q 10/103* (2013.01); *G06F 9/48* (2013.01); *G06F 17/30312* (2013.01)

(58) Field of Classification Search
None
See application file for complete search history.

(56) References Cited

U.S. PATENT DOCUMENTS

| | | | | |
|---|---|---|---|---|
| 6,662,199 B1 * | 12/2003 | Flight et al. | .................. | 707/694 |
| 6,728,947 B1 * | 4/2004 | Bengston | ....................... | 717/103 |
| 6,986,138 B1 * | 1/2006 | Sakaguchi et al. | ............ | 718/105 |
| 7,996,488 B1 * | 8/2011 | Casabella et al. | ............. | 709/217 |
| 2006/0200476 A1 * | 9/2006 | Gottumukkala et al. | ..... | 707/100 |
| 2007/0236708 A1 * | 10/2007 | Jahn et al. | ....................... | 358/1.6 |
| 2010/0241990 A1 * | 9/2010 | Gabriel et al. | ................. | 715/810 |

OTHER PUBLICATIONS

Configuring Business Application Systems Stefan Meinhardt, Karl Popp Handbook on Architectures of Information Systems p. III, IV, and 705-721 Published 2006.*
Supporting Provenance in Service-oriented Computing Using the Semantic Web Technologies Liming Chen and Zhuoan Jiao IEEE Intelligent Informatics BULLETIN, vol. 7 No. 1 (ISSN 1727-5997), p. 4-11 Published: 2006.*

* cited by examiner

*Primary Examiner* — Emerson Puente
*Assistant Examiner* — Paul Mills

(57) ABSTRACT

A system may create a workflow that includes work units, assign values to parameters of the work units, create a specification that associates the work units and the parameter values, generate a work order associated with the stock keeping unit specification, convert the specification into the work units based on the work order, instantiate tasks that correspond to the work units, and execute the tasks by one or more processors.

20 Claims, 15 Drawing Sheets

| WORKFLOW MANAGER 330 ||
|---|---|
| GET WORKFLOW ID 602 | GET WORKFLOW LIST 618 |
| SAVE WORKFLOW 604 | CHANGE WORKFLOW STATUS 610 |
| UPDATE WORKFLOW 606 | |

WORK UNIT DISTRIBUTE

| PRESET ID | NAME | PARAMETER | VALUE |
|---|---|---|---|
| | DEFAULT | RETRY_TIMES | 3 |
| | DEFAULT | RETRY_INTERVAL | 60 |
| | DEFAULT | COMMTYPE | SFTP |
| | DEFAULT | IP_ADDR | MUST BE ENTERED |
| | DEFAULT | USER ID | MUST BE ENTERED |
| | DEFAULT | PASSWORD | MUST BE ENTERED |

WORK UNIT DISTRIBUTE

| PRESET ID | NAME | PARAMETER | VALUE |
|---|---|---|---|
| | DEFAULT | RETRY_TIMES | 3 |
| | DEFAULT | RETRY_INTERVAL | 60 |
| 2 | AMAZON NY | COMMTYPE | SFTP |
| | | IP_ADDR | 10.10.10.2 |
| | | USER ID | AMAZON_USER_2 |
| | | PASSWORD | PASSWORD1 |

WORK UNIT DISTRIBUTE

| PRESET ID | NAME | PARAMETER | VALUE |
|---|---|---|---|
| | DEFAULT | RETRY_TIMES | 3 |
| 5 | AMAZON_COM | RETRY_INTERVAL | 120 |
| 2 | AMAZON NY | COMMTYPE | SFTP |
| | | IP_ADDR | 10.10.10.2 |
| | | USER ID | AMAZON_USER_2 |
| | | PASSWORD | PASSWORD1 |

FIG. 7C

| WORKFLOW MANAGER 330 ||
|---|---|
| GET WF PRESET ID 802 | GET WF PRESET 810 |
| SAVE WF PRESET 804 | CHANGE WF PRESET STATE 812 |
| UPDATE WF PRESET 806 | DELETE PRESET 814 |
| GET WF PRESET LIST 808 | |

FIG. 8

| WORKFLOW MANAGER 330 ||
|---|---|
| CREATE SKU 1002 | GET SKU LIST 1008 |
| DELETE SKU 1004 | GET OPERATION LIST 1010 |
| GET SKU DETAILS 1006 | GET OPERATION DETAILS 1012 |

FIG. 10

| TRANSPORT PROFILE 1102 |
|---|
| ID 1104 |
| ACCOUNT ID 1106 |
| PASSWORDUSER ID 1108 |
| LOCATION 1110 |
| PROTOCOL 1112 |

FIG. 11

| WORKFLOW MANAGER 330 ||
|---|---|
| CREATE PROFILE 1202 | GET PROFILE 1208 |
| UPDATE PROFILE 1204 | GET PROFILE PARAM 1210 |
| DELETE PROFILE 1206 | |

FIG. 12

| WORK UNIT TYPES 1500 ||
|---|---|
| CREATE METADATA 1502 | SPLIT MEDIA 1526 |
| TRANSFORM METADATA 1504 | DISTRIBUTE 1528 |
| INGEST METADATA 1506 | PACKAGE 1530 |
| INGEST MEDIA 1508 | ENCRYPT 1532 |
| CONFIRM DELIVERY 1510 | DECRYPT 1534 |
| ENCODE 1512 | ARCHIVE 1536 |
| DECODE 1514 | SAVE 1538 |
| AD MARKER 1516 | RETRIEVE 1540 |
| CLOSE CAPTIONING 1518 | QUALITY ASSURANCE 1542 |
| BRANCH 1520 | MANUAL INTERVENTION 1544 |
| MERGE 1522 | REPORT 1546 |
| TRANSFORM 1524 | ASSEMBLY 1548 |

FIG. 15

STOCK KEEPING UNITS FOR CONTENT PROCESSING

BACKGROUND

Consumer demand for media is increasing. For example, consumers often watch and/or listen to various media at home, while traveling, at work, etc. As a result, the number of communication channels for delivering media content and the number of different types of devices for playing the content has also increased.

BRIEF DESCRIPTION OF THE DRAWINGS

FIG. 6 is a list of exemplary interfaces that are associated with one or more workflows;

FIGS. 7A through 7C illustrate creating presets for a workflow;

FIG. 8 is a list of exemplary interfaces that are associated with managing presets;

FIG. 10 is a list of exemplary interfaces that are associated with SKU specifications;

FIG. 11 is a list of exemplary components of a transport profile;

FIG. 12 is a list of exemplary interfaces that are associated with the transport profile of FIG. 11;

FIG. 15 is a list of different types of exemplary work units.

DETAILED DESCRIPTION

Figure 1:
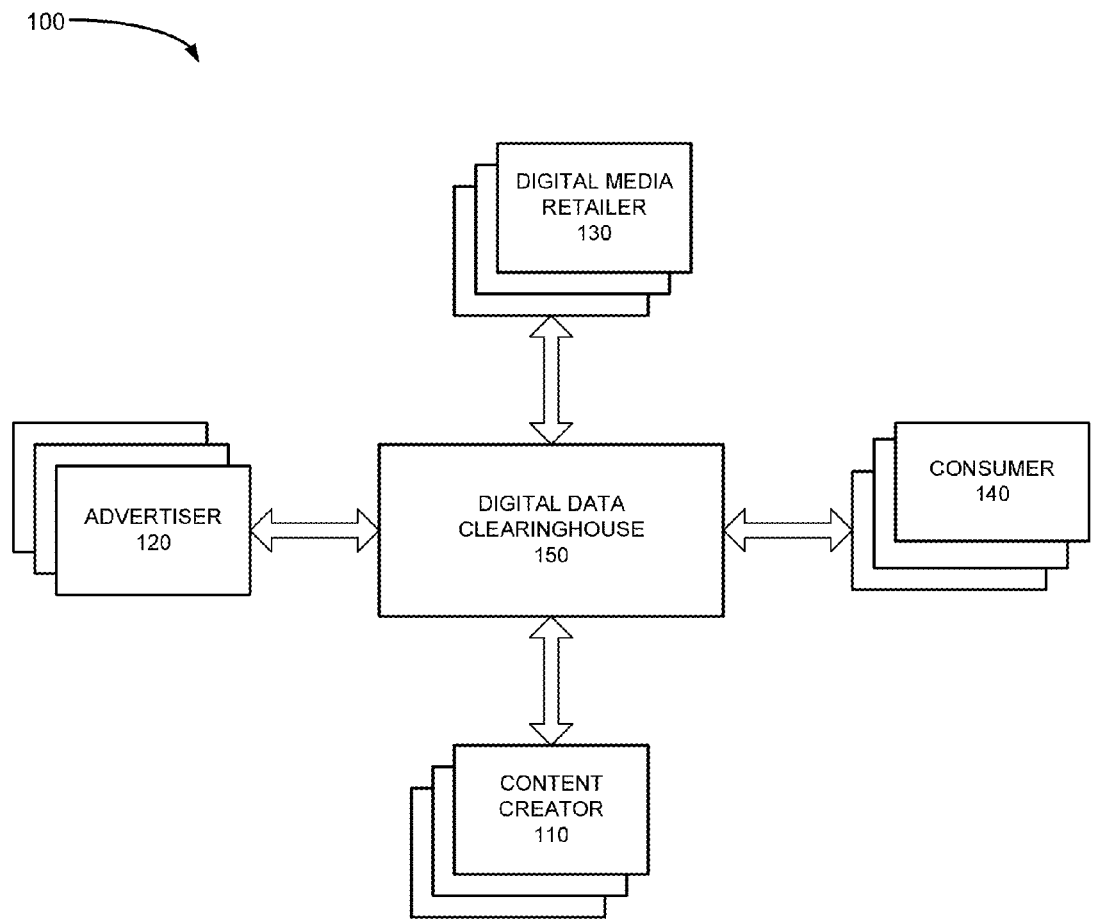
FIG. 1 schematically illustrates an exemplary system in which a digital distribution clearinghouse (DDC) may be implemented.

The following detailed description refers to the accompanying drawings. The same reference numbers in different drawings may identify the same or similar elements. As used herein, the term "content," also referred to as assets, may refer to multimedia content (e.g., text-based content, audio, and video such as a movie, show, television program, broadcast of a live event (e.g., sporting event, concert, etc.)). As used herein, the term "work unit" may refer to a description of a set of one or more operations that a system may perform on content (e.g., overlaying subtitles on a video, inserting advertisements into a video, etc.).

As described herein, a digital data clearinghouse (DDC) may allow a user to establish a setup for a new customer. During the setup, also referred to as "on-boarding," the user may create a DDC account and one or more workflows (both data and instructions) tailored for the new customer. The workflows may be assembled by interconnecting work units, each of which includes a basic task that is associated with content processing (e.g., transcoding, sending processed content to a customer, etc.).

In servicing the customer, the user may sometimes encounter situations in which the user repeatedly submits, given different input content, the same workflow with the same parameters for service orders. To facilitate handling such service orders, the DDC allows the user to create stock keeping unit (SKU) specifications. In the DDC, a SKU is an identifier that designates content processing which is equivalent to a specific workflow with parameters that are already set. When the user receives a service order whose content processing is designated by a SKU, the user may select the SKU and submit the SKU for the service order. When the DDC receives the service order with the SKU from the user, the DDC may resolve the SKU into a set of tasks and parameters that are associated with work units. Subsequently, the DDC may perform the tasks. In the preceding, the SKUs may spare the user from inputting and/or selecting parameter values.

For example, assume that a user (e.g., a DDC operator or administrator) defines two work units via the DDC. Also assume that the first work unit describes reformatting a M×N video into a 600×400 video, and the second work unit describes inserting an advertisement in the video. When a customer (e.g., a content creator/provider) places an order with the user, requesting that a video provided by the content creator/provider be formatted as a 600×400 video and an advertisement be inserted in the video, the user may select, through a graphical user interface (GUI) provided via the DDC, one of workflows that were created by concatenating the two work units. At this point, the user may select a preset that specifies the output resolution of the video as 600×400 pixel video for the first work unit, and/or generate a SKU specification that assigns a SKU to the workflow (or its equivalent) with the preset of 600×400 pixels.

Thereafter, whenever the user receives a work order whose content processing is equivalent to the workflow with the preset, the user may select and submit, as a service order, the SKU and an input content specification via the DDC GUI. In response, the DDC may schedule, for execution, a set of tasks that are associated with the work units included in the workflow. The DDC may perform these tasks. Via the use of the SKU, the user may avoid repetitively inputting the same parameters for work orders with equivalent content processing.

The preceding example is provided for simplicity. Descriptions below provide additional details with respect to workflows, presets, and SKUs in the context of the DDC. FIG. 1 is a block diagram of an exemplary system 100 in which the DDC may be implemented. Referring to FIG. 1, system 100 includes one or more content creators/providers 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical system may include more or fewer components than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below.

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of ways, based on the particular requirements associated with DMRs 130. In an exemplary implementation, DDC 150 may also aggregate various data and insert advertisements into the media content. DDC 150, consistent with implementations described herein, may also utilize flexible workflows to streamline the transformation and packaging of content for digital distribution.

As described above, the exemplary configuration illustrated in FIG. 1 is provided for simplicity. For example, it should be understood that consumers 140 in system 100 may include advertisers 120 or content creators 110; system 100 may include additional DDCs; etc. In addition, system 100 may include a large number (e.g., thousands) of different types of user devices associated with consumers 140, such as televisions, cellular telephones, personal computers (PCs) laptop computers, tablet computers, notebook computers, netbook computers, personal digital assistants (PDAs), etc. Consequently, in an actual implementation, system 100 may include additional components than those illustrated in FIG. 1, with different content paths.

Figure 2:
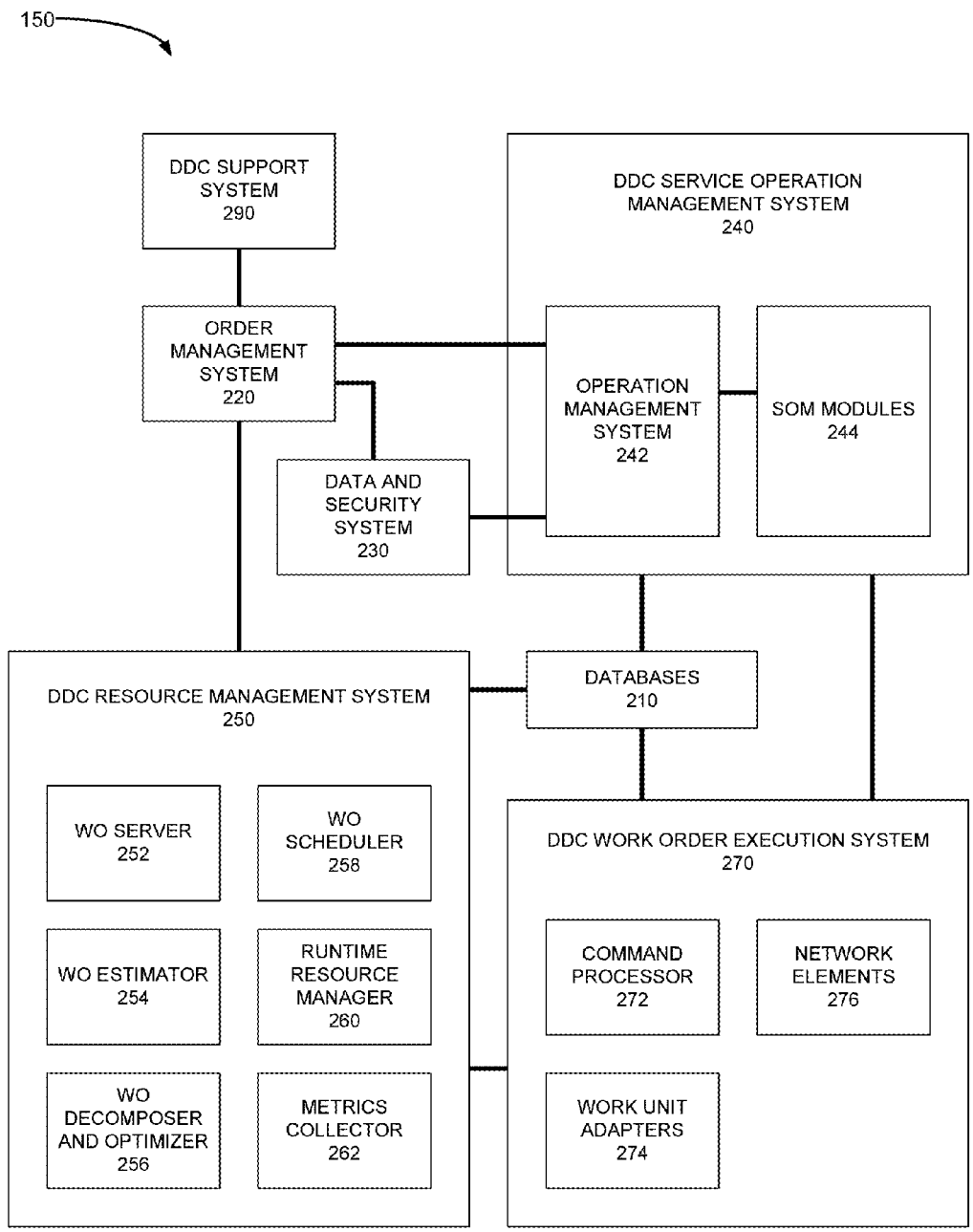
FIG. 2 illustrates an exemplary configuration of the DDC of FIG. 1.

FIG. 2 illustrates an exemplary configuration of DDC 150. Referring to FIG. 2, DDC 150 may include databases 210, order management system 220, data and security system 230, DDC service operation management system 240, DDC resource management system 250, DDC work order execution (WOE) system 270 and DDC support system 290.

Databases 210 may store work unit definitions, workflows, parameters, tables, presets, SKU specifications, etc., that are associated with various components in DDC 150, intermediate or end results of processing performed by different processes in DDC 150, etc.

Order management system 220 may include devices for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular SKU (e.g., an identifier associated with a set of operations) that will drive the processing of content associated with the order.

Data and security system 230 may include one or more devices to provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows.

DDC service operation management (SOM) system 240 may include one or more devices to control an overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, specify a SKU corresponding to one or more work unit operations, administer accounts that are associated with content creator 110 or DMR 130, submit a work order, add data and storage to DDC 150, manage resources, manage DDC configuration (e.g., create a work unit, assign a preset for the work unit, etc.), manage catalogs of content, run reports, monitor DDC work orders (e.g., information associated with a work order), etc.

In providing each of such services to a client, operation management system 242 may employ SOM modules 244. SOM modules 244 may include components/modules that correspond to the above-listed services. For example, the modules may include a security manager, workflow manager, account manager, work order manager, data and storage manager, resource management module, configuration manager, asset management module, catalog management module, monitoring and reporting module, etc. As further described below, via the configuration/workflow manager, a user may create a workflow using work units, select a workflow, associate work units of the workflow with presets, generate and use a SKU specification, and submit the workflow/SKU for execution.

DDC resource management system 250 may include one or more devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260, and metrics collector 262.

Depending on the embodiment, DDC resource management system 250 may implement additional, fewer, or different components than those illustrated in FIG. 2. For example, in one embodiment, DDC resource management system 250 may include a jeopardy manager to generate alarms when a rate of task processing falls below an acceptable threshold or will impact the target completion date/time. In another embodiment, DDC resource management system 250 may include a component for providing reports on resources, schedules, metrics, etc.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow/SKU (submitted via a workflow manager), based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units identified in the workflow/SKU specification associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous execution measurements, metrics collector 262 may modify factors that are used to estimate the resource and time necessary to complete a task associated with a work unit, for a particular asset.

DDC work order execution (WOE) system 270 may include one or more devices to manage the flow and execution of work units of a defined workflow associated with a work order. DDC WOE system 270 may include a command processor 272, work unit adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager, WO processor, and work unit processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more devices and/or personnel to provide support services, such creation of work units, composition of workflows, etc., billing support, contracting management, pricing, etc.

The configuration shown in FIG. 2 is for illustrative purposes. In other configurations and/or implementations, functions that are associated with one component or platform shown in FIG. 2 may be performed by one or more other components in FIG. 2; any of the components may be connected to any other of the components; and functions of one component may be included in another component. Accordingly, in the other configurations or implementations, DDC 150 may include additional, fewer, different, or a different arrangement of components than those illustrated in FIG. 2.

Figure 3:
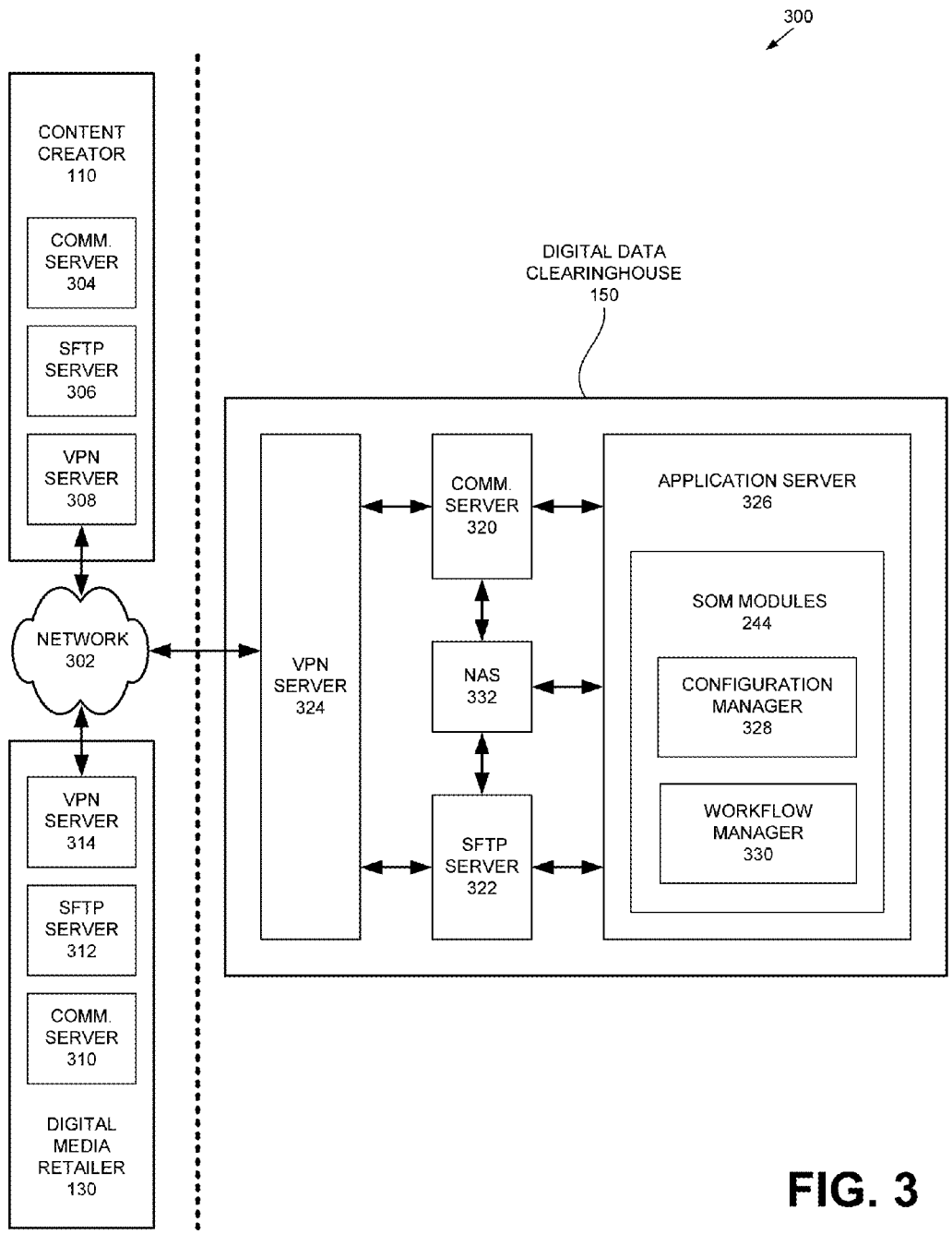
FIG. 3 illustrates an exemplary network in which a workflow manager associated with the DDC of FIG. 2 may be implemented.

FIG. 3 illustrates an exemplary network 300 in which DDC 150 may be implemented. Network 300 may include content creator 110, digital media retailer 130, digital data clearinghouse 150, and network 302. Although network 300 may include additional, fewer, or different network elements than those shown in FIG. 3 (e.g., advertiser 120, consumer 140, bridges, routers, switches, etc.), they are not illustrated in FIG. 3 for simplicity.

As shown, content creator 110 includes different servers for communicating with DDC 150, such as a communication server 304, a secure file transfer protocol (SFTP) server 306, a virtual private network (VPN) server 308. Other components of content creator 110 are not illustrated for simplicity. Communication server 304 and SFTP server 306 may receive or send content to/from DDC 150 via the fast and secure protocol (FASP) and secure file transfer protocol (SFTP), respectively, over a VPN. VPN server 308 may establish a virtual private network between content creator 110 and DDC 150 over network 302. Although FIG. 3 shows VPN as a communication medium, in an actual implementation, DDC 150 may employ other dedicated circuits or other means of transport for communication.

Also as shown, digital media retailer 130 includes a communication server 310, a SFTP server 312, and a VPN server 314. These components may operate similarly as components 304-308 in content creator 110.

Network 302 may include one or more wired and/or wireless networks that are capable of exchanging information, such as voice, video, documents, multimedia, text, etc., and capable of delivering content from one network element to another network element. For example, network 302 may include one or more public switched telephone networks (PSTNs) or another type of switched network. Network 302 may also include a number of transmission towers for receiving wireless signals and forwarding the signals toward the intended destination. Network 302 may further include one or more packet switched networks, such as an Internet protocol (IP) based network, a local area network (LAN), a wide area network (WAN), a personal area network (PAN), an intranet, the Internet, or another type of network that is capable of exchanging information.

DDC 150 may include a communication server 320, SFTP server 322, VPN server 324, network attached storage (NAS) 332, and application server 326. Communication server 320, SFTP server 322, and VPN server 324 may perform similar functions for DDC 150 as communication server 304, SFTP server 306 and VPN server 308 for content creator 110 (e.g., receive or distribute (e.g., send) content).

Application server 320 may include components for implementing DDC 150 (e.g., DDC service operation management system 240, DDC resource management system 250, DDC work order execution system 270, etc.) (not shown), serving web documents, serving applications to a client application, etc. In some implementations, application server 320 may support a particular set of standard interfaces (e.g., Java Platform Enterprise Edition™)

In FIG. 3, application server 326 is shown as including SOM modules 244, which in turn may include configuration manager 328 and workflow manager 330. As described above, a user (e.g., a DDC operator) may create, edit, save, administer, etc., work units and workflow via configuration manager 328 and workflow manager 330. The user may interact with configuration manager 328 and workflow manager 330 via a client, such as a web browser. For example, the client may receive user input, and based on the user input, may initiate a chain of method calls (via different components in DDC 150) to request creation of a workflow/preset or an SKU specification by configuration manager 328.

Figure 4:
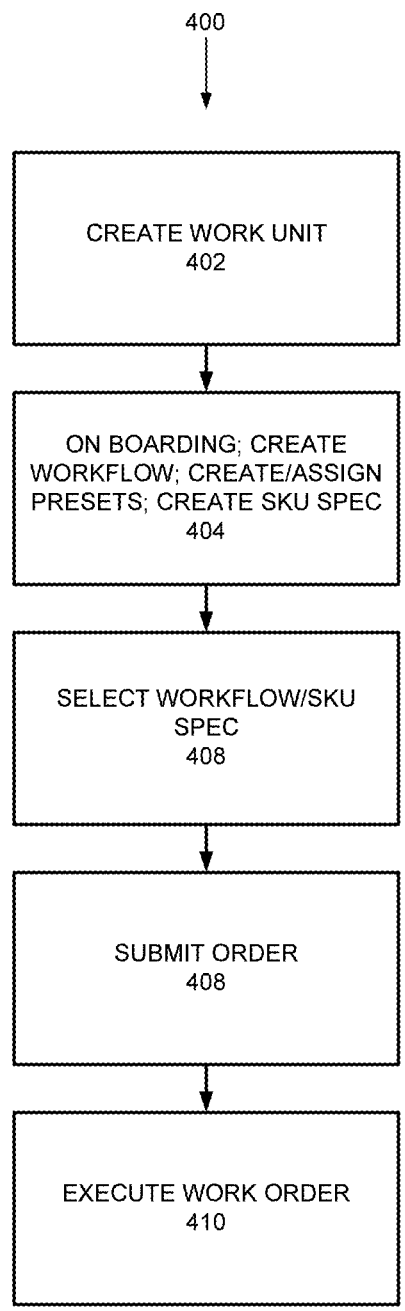
FIG. 4 is a flow diagram of an exemplary process that is associated with a stock keeping unit (SKU)

FIG. 4 is a flow diagram of an exemplary process 400 that is associated with the components of FIG. 2 and FIG. 3. Process 400 may include operations or actions (shown in blocks) that may be performed by DDC 150 for processing content. Process 400 is described herein for illustrative purposes. In a different context, DDC 150 may perform other processes that include additional, fewer, or different operations than those shown in FIG. 4. For FIG. 4, assume that a customer (e.g., a content creator/provider) has an account with DDC 150. Also, assume that a DDC operator (e.g., a user) is administering DDC 150.

DDC 150 may create a work unit (block 402). For example, the DDC operator may construct a work unit via a client graphical user interface (GUI) communicating with configuration manager 328. In creating the work unit, the DDC operator may specify parameters that characterize the work unit.

Figure 5A:
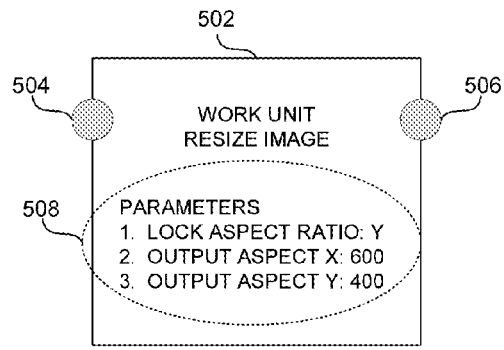
FIG. 5A is a block diagram of an exemplary work unit that is associated with the configuration manager of FIG. 3.

FIG. 5A is a block diagram of an exemplary work unit 502. As shown, work unit 502 may include an input connector point 504 (or an input port 504) and an output connector point 506 (or an output port 506) and parameters 508. DDC 150 may include other work units, each of which may include additional and/or different configurations than those illustrated in FIG. 5A.

Input port 504 may represent the type of input that work unit 502 may receive. For example, work unit 502 may receive a 1024×768 video stream (not shown). Output port 506 may represent the type of output that work unit 502 may generate. For example, work unit 502 may generate 600×400 video, based on a 1024×768 input video. Other types of work units may include different types of input/output ports. For example, a work unit for packaging a video for distribution may include an input port for receiving metadata and another input port for receiving a video. The work unit may also include an output port for generating a packaged video (e.g., a video coupled to metadata).

Parameters 508 may include values that characterize work unit 502. For example, in FIG. 5A, parameters 508 include a flag indicating whether an aspect ratio of an output video is to be the same for all videos processed by work unit 502; a X-resolution of 600; and a Y-resolution of 400. The parameters may be stored in one or more databases 210. In addition, the parameters can be set up as system values that are not changeable, default values that are changeable, default values that require user verification, and parameters that require user entry.

Returning to FIG. 4, once one or more work units have been created, the work units may be used to compose a workflow. For example, when a customer signs up for services with DDC 150, DDC 150 may perform "on-boarding" operations. The on-boarding operations may include creating a new account for a content provider or a DMR 130 via operation management system 242 and the account manager in SOM modules 244. The account creation may entail creating a new account record, configuring the account, setting up parameters, composing one or more new workflows using the work units, and/or specifying SKUs (block 404). In composing a new workflow, the user may also use or create one or more presets, which are described below.

For example, assume that the DDC operator has received a specification, from a customer, for transforming a 1024×768 video to a 600×400 video. Based on the specification, the DDC operator may assemble a workflow via configuration manager 328 and/or workflow manager 330. The workflow may include work unit 502.

Figure 5B:
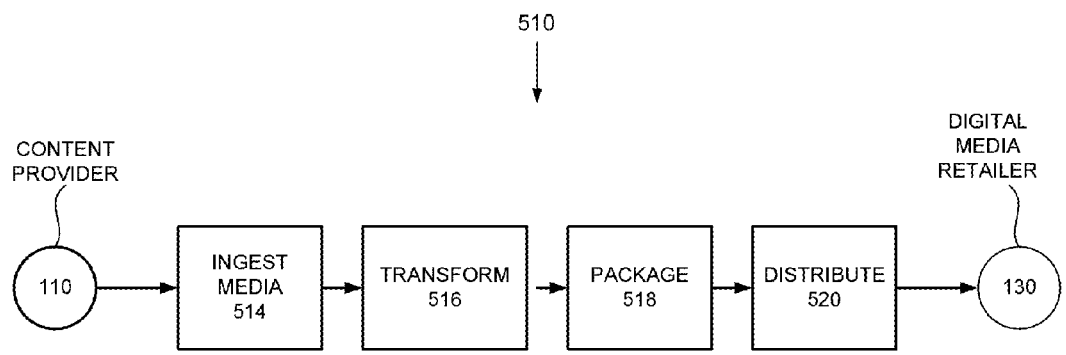
FIG. 5B is an exemplary workflow diagram.

FIG. 5B illustrates an exemplary workflow diagram 510. In one implementation, DDC 150 may display workflow diagrams at a GUI client via configuration manager 328. The DDC operator may edit and/or save such workflow, represented by workflow diagrams. As shown in FIG. 5B, workflow diagram 510 includes a content creator/provider 110, pull media work unit 514, transcode work unit 516, package work unit 518, distribute work unit 520, and DMR 130. Other workflow diagrams may include the same, additional, and/or different work units than the ones illustrated in FIG. 5B.

In workflow diagram 510, the input and output ports of work units 514 through 520 connect one work unit to another work unit. For example, the output port of pull media work unit 514 is connected to the input port of transcode work unit 516. Connecting work units 514-520 may form a processing path through which media content may "flow."

To allow the user to manage workflows, presets, and/or SKUs (e.g., create, update, edit, and/or perform other functions that are associated with workflows), workflow manager 330 in DDC 150 may include a number of interfaces for invoking method/procedure/programs (e.g., remote or local calls) that are accessible to users. FIG. 6 is a list of exemplary interfaces that are associated with managing workflows.

As shown, workflow manager 330 may include workflow interfaces 600, which in turn includes a get workflow ID interface 602, save workflow interface 604, update workflow interface 606, get workflow list interface 608, and change workflow status interface 610. Although workflow manager 330 may include other interfaces for managing workflows, they are not listed in FIG. 6 for simplicity. Other types of interfaces that workflow manager 330 includes are described below with reference to FIG. 8A.

Get workflow ID interface 602 may generate or retrieve, when invoked by a calling method/program, an identifier that may be associated with a new workflow when the workflow is saved. Save workflow interface 604 may create or insert all database entries for a workflow/sub-workflow. When a calling method/program invokes the save workflow interface

604, the calling method/program may provide, as arguments to the interface, a customer account ID, a workflow ID, workflow version, and data that describes the structures of the workflow.

Update workflow interface 606 may update all database entries for a workflow/sub-workflow. Update workflow interface 606 may be invoked with the same or similar arguments as the save workflow ID interface 604. Get workflow list interface 608 may return a list of descriptions of all workflows whose customer account ID and active status (e.g., active, inactive, testing, etc.) match those provided by the calling method/program. Change workflow status 610 may modify the current state of a particular workflow, designated by a workflow ID and workflow version number.

Returning to FIG. 4, during the creation or editing of a workflow, workflow manager 330 may associate the workflow with one or more groups of parameters, referred to as "presets" (block 404). A user may be retrieve and associate, with the workflow or a sub-workflow, a previously saved preset for another workflow (which may be used with other sub-workflow or workflows). FIGS. 7A through 7C illustrate creating or retrieving presets for a workflow.

FIG. 7A shows an exemplary work unit 702 in a workflow (not shown). When a user at order management system 220 enters particular menu node at a client application (e.g., browser), the application may retrieve a view of a workflow. The view may show work unit 702 with a number of different parameters. As shown, the parameters may include a RETRY TIMES (e.g., the number of times an asset may be distributed via work unit 702), RETRY INTERVAL (e.g., the number of minutes between retry attempts), COMMTYPE (e.g., the type of communication protocol that is to be used for distributing the asset, such as SFTP), IP ADDRESS (e.g., the IP address of the device to which DISTRIBUTE work unit 702 may attempt to transfer the asset), a USER ID and PASSWORD (e.g., the user ID and the password used to log into the device to which work unit 702 may attempt to distribute the asset). In addition, FIG. 7A shows work unit 702 with default values for the parameters. The definitions as well as values for these parameters may be stored in database 210.

FIG. 7B shows creation of a preset. As shown, the user may provide values for parameters IP ADDRESS, USER ID, and PASSWORD. Furthermore, the user may group COMMTYPE, IP ADDRESS, USER ID, and PASSWORD parameters by placing a box 704 around the parameters (e.g., via a mouse cursor or another type of GUI input component), and activate a process to create a preset. In FIG. 7B, the preset includes a preset ID of 2 and the parameters COMMTYPE, IP ADDRESS, USER ID, and PASSWORD.

FIG. 7C also illustrates creation of a preset. In contrast to the preset in FIG. 7B, however, preset created in FIG. 7C includes only one parameter named AMAZON COM. As shown, the preset ID of the preset is 5.

These presets may be stored in database 210, and retrieved for the same type of work unit in another workflow for the client application. From the GUI interface shown on a display, the user may select the preset, or input new values for the parameters. By using presets, the user may quickly supply values for parameterized workflow.

In some instances, the user may not only create and select presets for work units, but also one or more presets for a sub-workflow (e.g., a workflow that may be part of another workflow). The user may create a sub-workflow via a GUI by selecting work units and activating a menu item or selection component (e.g., button) of the GUI. The user may create a preset for the workflow by associating a set of parameter values of work units for the sub-workflow.

Figure 7D:
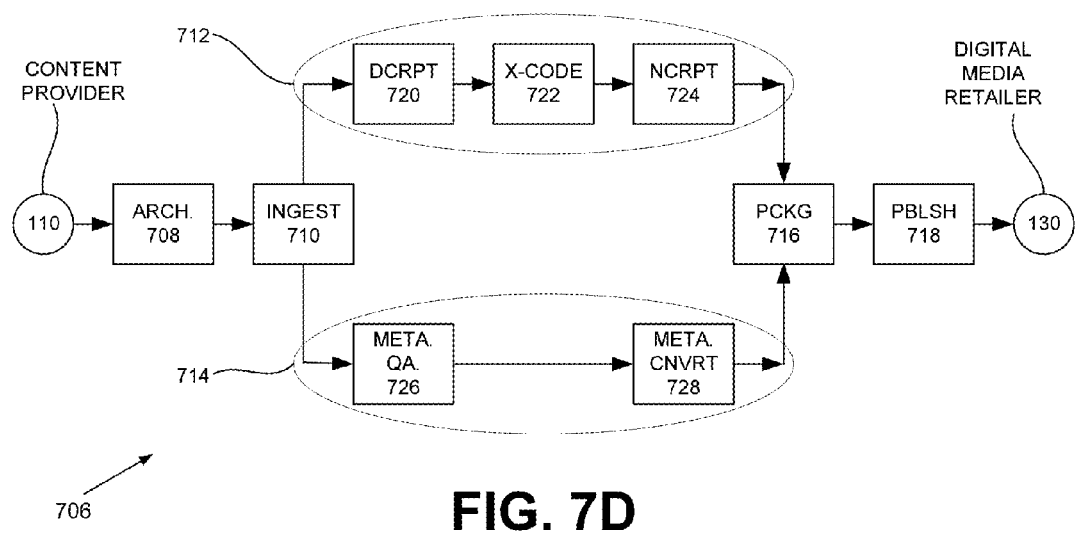
FIG. 7D illustrates exemplary sub-workflows with which presets may be associated.
Figure 7E:
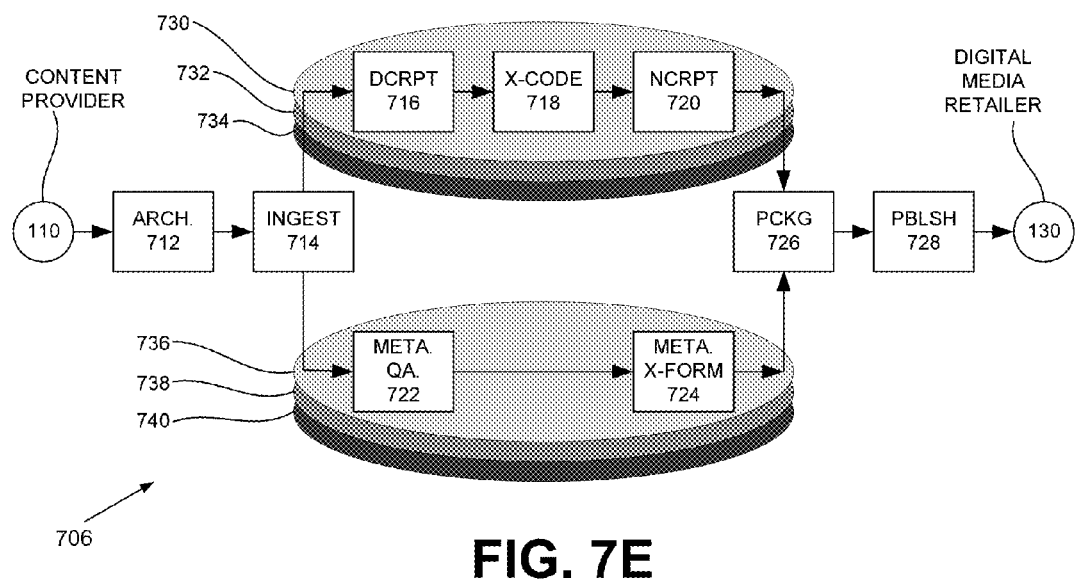
FIG. 7E illustrates an exemplary relationship between workflows and presets.

FIGS. 7D and 7E illustrate selecting presets that are associated with sub-workflows. FIG. 7D illustrates an exemplary workflow 706 with which presets are associated. As shown, workflow 706 may include an archive work unit 708, ingest work unit 710, sub-workflow 712, sub-workflow 714, package work unit 716, and publish work unit 718. Depending on the implementation, workflow 706 may include other work units and/or sub-workflows.

Archive work unit 708 receives content from content provider 110 and archives the content. Ingest work unit 710 may include one or more work units for normalizing the content received from archive work unit 708. The normalization may include, for example, standardizing metadata associated with the content. Ingest work unit 710 provides two outputs, normalized content and metadata, to sub-workflow 712 and sub-workflow 714, respectively.

As further shown in FIG. 7D, sub-workflow 712 includes a decrypt work unit 720, transcode work unit 722, and encrypt work unit 724. These work units decrypt, transcode, and encrypt the content, respectively. In addition, encrypt work unit 724 outputs the content processed by sub-workflow 712 to package work unit 716.

As also shown in FIG. 7D, sub-workflow 714 includes a metadata quality assurance work unit 726 and a metadata convert work unit 728. These work units perform quality assurance and convert the metadata of the content from one format to another format, respectively. In addition, metadata convert work unit 728 outputs the metadata processed by sub-workflow 714 to package work unit 716.

Package work unit 716 combines the processed content and metadata from sub-workflows 712 and 714 and generates a package. Publish work unit 718 then sends the package from package work unit 716 to a designated media retailer 130.

FIG. 7E illustrates selecting presets for workflows 707. As shown, sub-workflow 712 is associated with presets 730-734, and workflow 714 is associated with presets 736-740. When the user selects workflow 706 for a particular work order, the user may also select one of presets 730-734 for sub-workflow 712 and one of presets 736-740 for sub-workflow 714 via a GUI. By allowing the user to conveniently select the presets, rather than laboriously inputting/setting values of individual parameters of the work units, DDC 150 may also allow the user to easily submit a work order.

FIG. 8 is a list of exemplary interfaces 800 that are associated with managing presets. As shown, workflow manager 330 may include a get workflow preset ID interface 802, save workflow preset interface 804, update workflow preset interface 806, get workflow preset list interface 808, get workflow preset interface 810, change workflow preset state interface 812, and delete preset interface 814. Although workflow manager 330 may include other interfaces on presets, they are not listed in FIG. 8 for simplicity. Furthermore, depending on the implementation, workflow manager 330 may include additional or different interfaces than the ones illustrated in FIG. 8.

Get workflow preset ID interface 802 may retrieve, when invoked by a calling method/program, an identifier that may be associated with a new preset, an account, and a workflow when the preset is saved. Save workflow preset interface 804 may create or insert database entries of a set of parameters for a specific work unit within a given workflow.

Update workflow preset interface 806 may update preset values. Get workflow preset list 808 may return a list of presets for a given workflow and a given state (e.g., new, test, active, inactive, etc.). Get workflow preset interface 810 may retrieve parameter settings for a specific preset. Change workflow preset state 812 may modify the current state of a particular preset for a work unit of a workflow. Delete preset 814 may delete a specific preset for a particular workflow.

Figure 9:
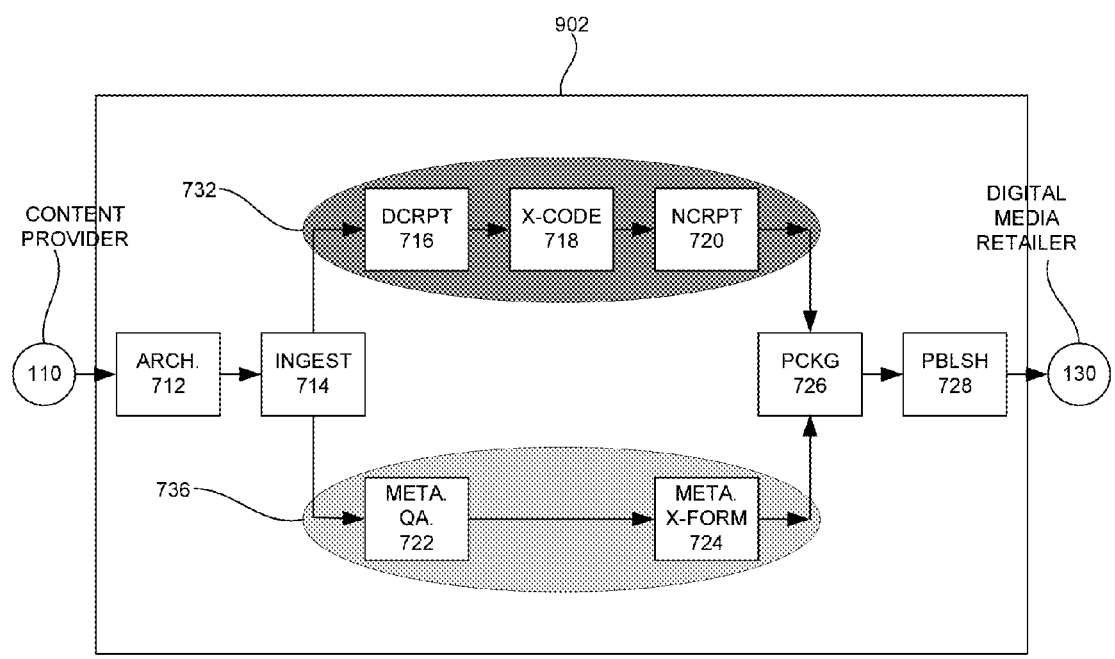
FIG. 9 illustrates creating an exemplary SKU.

Returning to FIG. 4, in addition to creating workflows and presets, a user may create a SKU specification (block 404). FIG. 9 illustrates creating an exemplary SKU specification 902. Assume that a user has selected workflow 706 with presets 732 and 736. In addition, assume that the selection of presets 732 and 736 and a selection of transport profiles (e.g., information for downloading and/or uploading) for content creator 110 and DMR 130 provide for all parameters that are needed for executing workflow 706. Via a DDC GUI, the user may activate a menu item to generate a SKU specification, represented in FIG. 9 by item 902. SKU specification 902 may associate operations that are represented by work units 712-728, parameters for each of work units 712-728 (e.g., presets 732 and 736), and a SKU identifier (e.g., an identifier for SKU specification 902). Once SKU specification 902 is created, the user may use SKU specification 902 with different transport profiles. To use SKU specification 902, the user may select the SKU for the SKU specification 902 via a DDC GUI and a desired transport profile.

FIG. 10 is a list of exemplary interfaces that are associated with SKU specifications. As shown, workflow manager 330 may include a create SKU interface 1002, delete SKU interface 1004, get SKU details interface 1006, get SKU list interface 1008, get operation list interface 1010, and get operation details interface 1012. Depending on the implementation, DDC 150 may provide for additional, fewer, or different interfaces than those illustrated in FIG. 10.

Create SKU interface 1002 may create a SKU specification and a SKU identifier and associate the identifier with the SKU specification. The SKU specification may include a description of operations that correspond to work units and reference to parameter values and/or presets. Delete SKU interface 1004 may delete a designated SKU specification from DDC 150. Get SKU details interface 1006 may retrieve information pertaining to a SKU specification, such as, for example, the operations specified by the SKU specification, the values of parameters of for work units, etc.

Get SKU list interface 1008 may retrieve a list of SKUs that are associated with a particular customer account. Get operation list interface 1010 may obtain, given a SKU, a list of operations that correspond to work units that are designated by the SKU. Get operation details interface 1012 may retrieve details of an operation among operations that are specified by the SKU.

Returning to FIG. 9, although SKU specification 902 indicates operations that are to be performed on content, SKU specification 902 may not include information for obtaining input content. Therefore, when the user submits SKU specification 902 for content processing, the user also needs to specify how and from where the content is to be obtained. In DDC 150, the information for obtaining the content for processing may be provided in transport profiles.

FIG. 11 is a list of exemplary components of a transport profile 1102 that may be submitted with a SKU specification to DDC 150 as part of a service order. As shown, transport profile 1102 may include an ID 1104, account ID 1106, password/user ID 1108, location 1110, and protocol 1112. Depending on the implementation, transport profile 1102 may include additional, fewer, or different components than those illustrated in FIG. 11.

ID 1104 may include a unique identifier generated for the transport profile by DDC 150. Account ID 1106 may include an identifier of the customer account to which the profile belongs. Password/user ID 1108 may include authentication information for downloading/uploading data (e.g., data) from an external source (e.g., a server outside of a network in which DDC 150 resides). Location 1110 may indicate a network address from/to which the content/data may be obtained or sent (e.g., URL, IP address, etc.). Protocol 1112 may specify the communication protocol via which the content/data may be obtained or sent (e.g., SFTP, fast and secure protocol, http protocol, etc.).

FIG. 12 is a list of exemplary interfaces that are associated with transport profile 1102. As shown, workflow manager 330 may include a create profile interface 1202, update profile interface 1204, delete profile interface 1206, get profile interface 1208, and get profile parameters interface 1210. Depending on the implementation, workflow manager 330 may include additional, fewer, or different interfaces for handling transport profiles.

Create profile interface 1202 may receive a set of parameters for creating a transport profile and generate the transport profile (e.g., create a record in a database). Update profile interface 1204 may modify an existing transport profile. Delete profile interface 1206 may delete an existing profile from DDC 150 (e.g., remove a transport profile record from database 210). Get profile interface 1208 may retrieve a specific transport profile, for example, from database 210. Get profile parameters interface 1210 may retrieve values of transport parameters (e.g., a value of location field 1110) from DDC 150.

Returning to FIG. 4, once a workflow/SKU has been created, tested, and saved, the customer may place a request with DDC 150 to process content in accordance with the workflow/SKU. Upon receiving the request, the user/DDC operator may log onto the customer account and select a workflow corresponding to the requested processing along with a set of parameters that are to be applied to the workflow (block 406). Alternatively, the user may select a SKU and a transport profile (block 406).

Next, the user may submit an order with DDC 150, to process the content in accordance with the selected workflow/SKU (block 408). When operation management system 242 and the work order manager in SOM modules 244 relay the order to DDC resource management system 250, WO decomposer and optimizer 256 may convert each processing element specified by the SKU or the workflow into a work unit task. In addition, for each connection between an input port of one work unit and an output port of another work unit, WO decomposer and optimizer 256 may create a "connector." A connector may represent either a memory or space in databases 210 to store data of the type specified by the output port, of a work unit, to which one end of the connection is coupled. When a process corresponding to the work unit places its output data in the connector (e.g., place the data in the memory or the space in database 210), another work unit whose input port is attached to the other end the connector may remove (e.g., "consume") the data from the connector and perform its own processing.

To DDC 150, when the submitted order has been reviewed and approved, the order becomes a work order that may be scheduled for execution by components in DDC resource management system 250 and executed by components in DDC work order execution system 270 (block 410). In databases 210, each work unit in the workflow is instantiated as a task to be performed.

Figure 13:
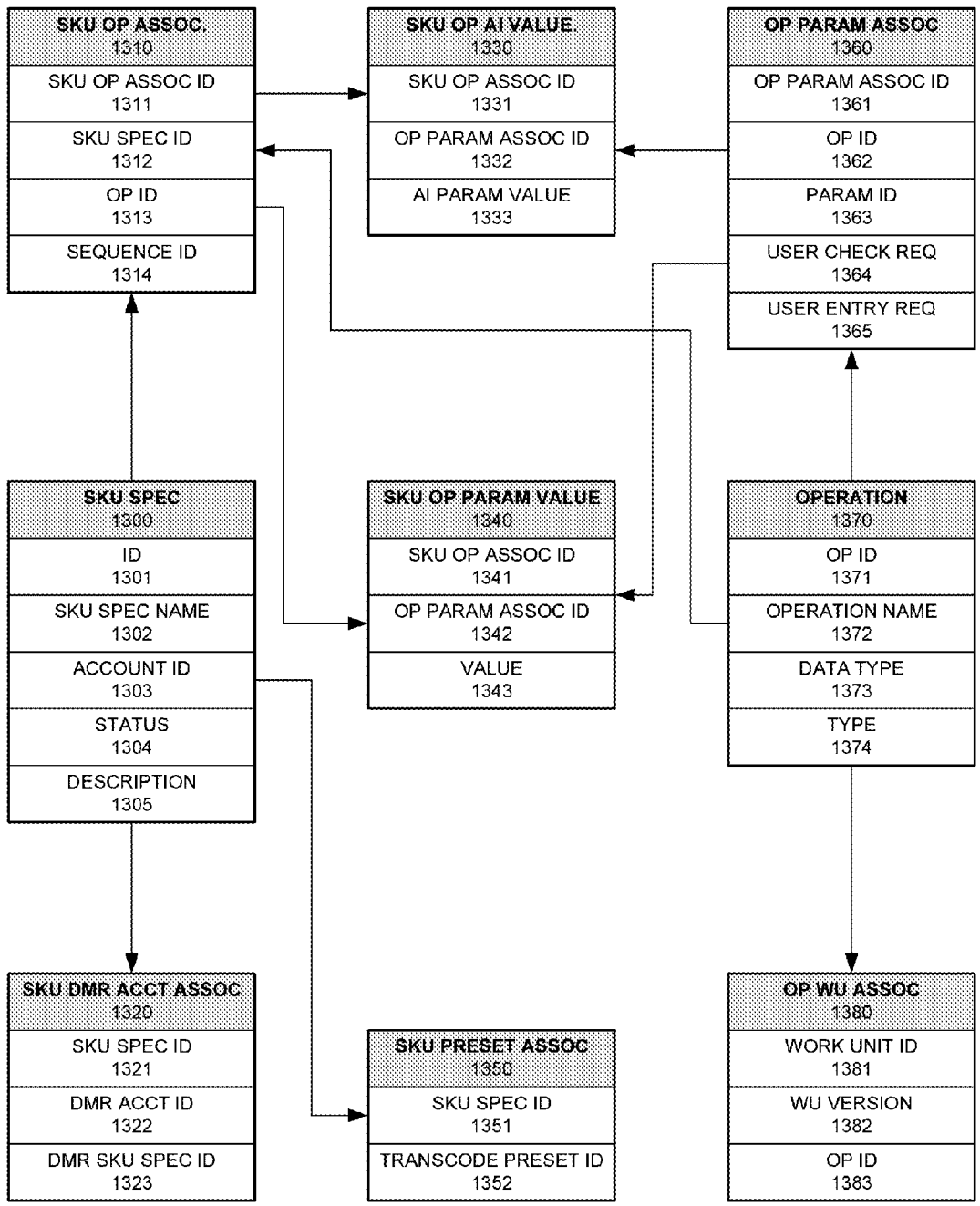
FIG. 13 is a list of exemplary tables illustrating relationship between SKUs, presets, and work units.

FIG. 13 is a list of exemplary tables, in DDC 150, that pertain to SKUs, presets, and work units. When a SKU specification or other related components (e.g., operation) are created, workflow manager 330 and/or other SOM modules 244 may update or generate, in database 210 or in another memory, tables that characterize and track the SKU specification and the other components. These tables may represent persistent versions of the SKU specification and the objects. Accordingly, after a system shutdown or failure, the SKU specification and/or the other components may be re-instantiated from the tables. In addition, the tables may be used for bookkeeping purposes.

FIG. 13 also illustrates the relationship between tables 1300-1380. AS indicated by the arrows in FIG. 13, a number of fields in each of tables 1300-1380 are obtained from other tables. For example, SKU Op Association table 1310 includes a SKU specification ID field 1312 whose value is from ID field 1301 in SKU specification table 1300.

As shown in FIG. 13, DDC 150 may include a SKU specification table 1300, SKU Op Association table 1310, SKU DMR Account Association table 1320, SKU Op Assembly Instruction (AI) value table 1330, SKU Operation Parameter value table 1340, SKU Preset Association table 1350, Operation Parameter Association table 1360, Operation table 1370, and Operation Work Unit (WU) Association table 1380.

SKU specification table 1300 may include records that describe or define instances of a SKU specification. Each record in SKU specification table 1300 may include an ID field 1301, SKU specification name field 1302, account ID field 1303, status field 1304, and description field 1305. ID field 1301 may indicate a unique identifier for a SKU specification. SKU specification name field 1302 may provide a symbolic name to the SKU specification. Account ID field 1303 may include an identifier of the customer account with which the SKU specification is associated. Status field 1304 may indicate whether the SKU specification is new, being tested, etc. Description field 1305 may provide a description of the SKU specification.

SKU Op Association table 1310 may include records that associate a SKU designated by SKU specification table 1300 with an operation corresponding to a work unit. Each record in SKU Op Association table 1310 may include a SKU Op Association ID field 1311, SKU specification ID field 1312, operation ID field 1313, and sequence ID field 1314. SKU Op Association ID field 1311 may indicate an identifier for the association. SKU specification ID field 1312 may include the value of ID field 1301 in a SKU specification table 1300. Operation ID field 1313 may include an ID for identifying an operation that corresponds to a work unit. Sequence ID field 1314 may indicate the ordinal number of the operation within the SKU (e.g., when 3 operations are specified by a SKU specification, the operations may be associated with integers 1, 2, and 3).

SKU DMR Account association table 1320 may include records that associate DMRs 130 with customer accounts and SKU specifications. Each record in SKU DMR Account association table 1320 may include a SKU specification ID field 1321, DMR Account ID field 1322, and DMR SKU specification ID 1323. SKU specification ID field 1321 may include the value of ID field 1301 in a SKU specification 1300. DMR Account ID field 1322 may include an identifier, in DDC 150, that is associated with DMR 130. DMR SKU specification ID field 1323 may include an identifier assigned by DDC 150 to DMRs 130 to which processed content may be distributed by work unit processes spawned based on the SKU specification.

SKU Op AI value table 1330 may include records that represent an operation and parameters for operations in assembling an asset. Each record in SKU Op AI value table 1330 may include SKU Op Association ID field 1331, Operation Parameter Association ID field 1332, and AI Parameter Value field 1333. SKU Op association ID field 1331 may include the value of SKU Op Association ID field 1311 in SKU Op Association table 1310. Operation Parameter Association ID field 1332 may include the value from Operation Parameter Association ID field 1361 in Operation Parameter Association table 1360, described below. AI Parameter value 1333 may include a value that indicates an instruction for assembly of an asset for a DMR 130.

SKU Operation Parameter value table 1340 may include records that represent values for parameters of an operation that correspond to a work unit. Each record in SKU Operation Parameter value table 1340 may include a SKU Op Association ID field 1341, Operation Parameter Association ID field 1342, and a value field 1343. SKU Op Association ID field 1341 may include the value of SKU Op Association ID field 1311 in SKU Op Association table 1310. Operation Parameter Association ID field 1342 may include the value of Operation Parameter Association ID field 1361 in Operation Parameter Association table 1360. Value field 1343 may include the value of the parameter designated via Operation Parameter Association ID field 1342.

SKU Preset Association table 1350 may include records that associate presets with SKUs. SKU Preset Association table 1350 may include a SKU specification ID field 1351 and transcode preset ID field 1352. SKU specification ID field 1351 may include the value of ID field 1301 in a SKU specification table 1300. Transcode preset ID field 1352 may include an identifier for a preset for the SKU specification.

Operation Parameter Association table 1360 may include records that associate an operation with a parameter. Each record in Operation Parameter Association table 1360 may include an operation parameter association ID field 1361, operation ID field 1362, parameter ID field 1363, user check required field 1364, and user entry required field 1365. Operation parameter association ID field 1361 may include an identifier for a Operation Parameter Association table 1360. Operation ID field 1362 may include an identifier of the operation. Parameter ID field 1363 may include an identifier for the parameter. User check required field 1364 may indicate whether assigning (e.g., associating) the parameter to the operation requires a user to check its validity. User entry required field 1365 may indicate whether inputting the parameter value requires the user to enter the value.

Operation table 1370 may include records that describe operations. Each record in operation table 1370 may include an operation ID field 1371, operation name field 1372, data type field 1373, and type field 1374. Operation ID field 1371 may include an identifier for the operation. Operation name field 1372 may provide a name for the operation. Data type field 1373 may include the type of input data that the operation may require. Type field 1374 may describe the type of data that the operation may output.

Operation WU Association table 1380 may include records that associate operations with work units. Each record of Operation WU Association table 1380 may include WU ID field 1381, WU Version field 1382, and operation ID field 1383. WU ID field 1381 may identify the work unit with which the operation is associated. WU Version field 1382 may identify the version of the work unit with which the operation is associated. Operation ID 1383 may include an identifier of the operation with which the work unit is associated.

Although DDC 150 may include additional tables, they are not illustrated in FIG. 13 for simplicity. Furthermore, each of tables 1300-1380 may include additional, fewer, or different fields than those illustrated in FIG. 13.

Figure 14:
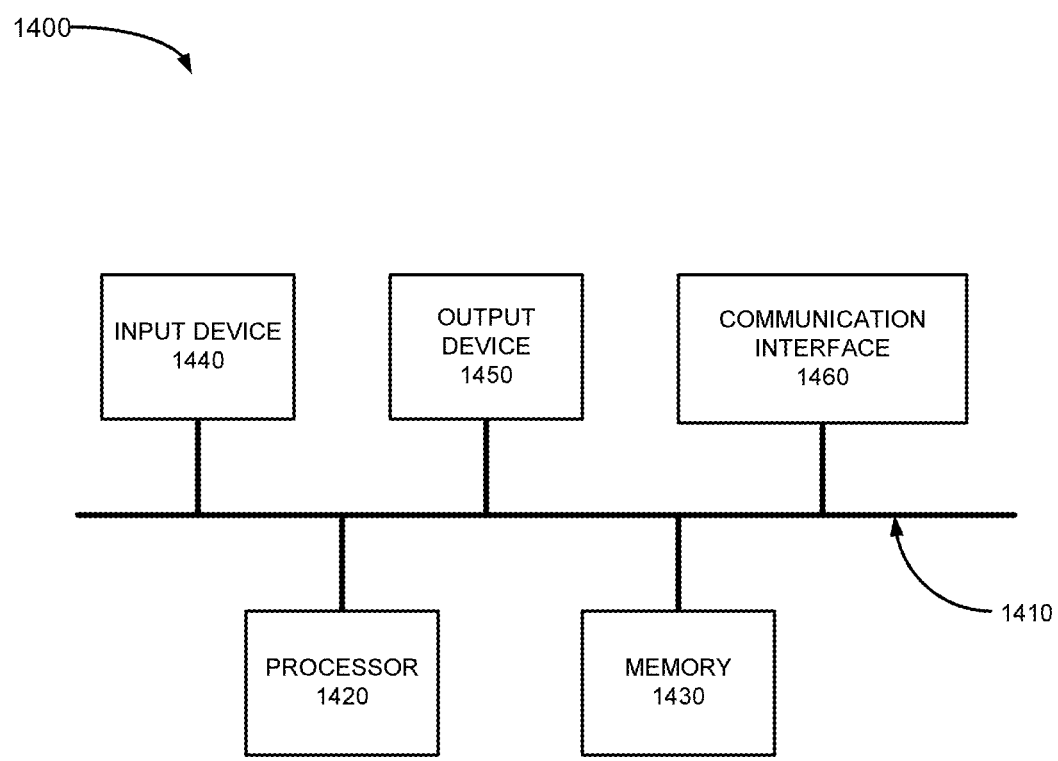
FIG. 14 is a block diagram of an exemplary network device of FIG. 2.

FIG. 14 is a block diagram of an exemplary network device 1400. Network device 1400 may correspond to one or more of devices that may be used to implement, for example, components illustrated in FIG. 2. Referring to FIG. 14, network device 1400 may include bus 1410, processor 1420, memory 1430, input device 1440, output device 1450 and communication interface 1460. Bus 1410 may include a path that permits communication among the elements of network device 1400.

Processor 1420 may include one or more processors, microprocessors, or processing logic that may interpret and execute instructions. Memory 1430 may include a random access memory (RAM) or another type of dynamic storage device that may store information and instructions for execution by processor 1420. Memory 1430 may also include a read only memory (ROM) device or another type of static storage device that may store static information and instructions for use by processor 1420. Memory 1430 may further include a storage device, such as a solid state drive (SDD), a magnetic and/or optical recording medium (e.g., a hard disk), etc. Depending on the context, the term "memory," "storage," "storage device," and/or "storage unit" may be used interchangeably. For example, a "computer-readable storage device" or "computer-readable medium" may refer to both a memory and/or storage device.

Input device 1440 may permit a user to input information to network device 1400, such as a keyboard, a keypad, a mouse, a pen, a microphone, a touch screen, voice recognition and/or biometric mechanisms, etc. Output device 1450 may include a mechanism that outputs information to the user, including a display, a printer, a speaker, etc. In some implementations 1440, because network device 1440 may operate as a server device, network device 1400 may include minimal number of input device 1440 and output device 1450 (e.g., a keyboard and/or a console), to minimize cost and to increase robustness.

Communication interface 1460 may include a transceiver (e.g., a transmitter or receiver) for network device 1400 to communicate with other devices and/or systems. For example, via communication interface 1460, network device 1400 may communicate over a network, such as the Internet, an intranet, a terrestrial wireless network (e.g., a WLAN, WiFi, WiMax, etc.), a satellite-based network, optical network, etc. Communication interface 1460 may also include a modem, an Ethernet interface to a LAN, and/or another interface.

FIG. 15 is a list 1500 of different types of work units. Within DDC 150, the work unit types in list 1500 may be part of a library, from which individual work units may be selected for assembling a workflow. As shown, list 1500 includes a create metadata work unit 1502, transform metadata work unit 1504, ingest metadata work unit 1506, ingest media work unit 1508, confirm delivery work unit 1510, encode work unit 1512, decode work unit 1514, advertisement marker work unit 1516, close captioning work unit 1518, branch work unit 1520, merge work unit 1522, transform work unit 1524, split media work unit 1526, distribute work unit 1528, package work unit 1530, encrypt work unit 1532, decrypt work unit 1534, archive work unit 1536, save work unit 1538, retrieve work unit 1540, quality assurance work unit 1542, manual intervention work unit 1544, report work unit 1546, and assembly work unit 1548. Although each of work units 1502-1548 is described below as performing one or more operations, the actual operations are performed via a corresponding work unit process instantiated based on the particular work unit during runtime. Depending on the setting, configuration, version, implementation, etc., DDC 150 may provide for additional or different work units than those in list 1500.

Each of work units 1502-1548 may serve one or more business logic/rules associated with content acquisition, transformation and distribution. For example, work units 1502-1508 and 1532-1546 may serve the business logic associated with ingesting asset/content from a content provider; work units 1504, 1512-1526, and 1536-1546 may serve the business logic associated with asset/content transformation; work units 1510, 1528-1534, 1538-1546 may serve the business logic associated with distribution of asset/content, and work unit 1548 may serve the business logic associated with activities prior to ingesting assets.

Create metadata work unit 1502 may receive an asset (e.g., media content) and a length/size of the asset and generate corresponding metadata when the asset does not include metadata. Transform metadata 1504 may receive metadata in one format and convert the metadata in accordance with a different standard or format (e.g., translate between different metadata standards or formats). In some implementations, DDC 150 may also include related work units, such as a work unit for normalizing metadata (e.g., changing metadata format into a standard one). Such a work unit may assign an identifier for each metadata type, as well as a different metadata version number.

Ingest metadata work unit 1506 may obtain metadata associated with assets (e.g., download the assets) from a source via, for example, a SFTP client/server application, Aspera Fasp™, Windows™ Common Internet File System (CIFS), hypertext transfer protocol (HTTP), etc. Ingest media work unit 1508 may obtain assets from a source. Confirm delivery work unit 1510 may generate and send a message to, for example, a DDC operator, process, customer, etc., upon successfully delivering an asset to an end point (e.g., DMR 130).

Ingest work units 1506 and 1508 may ingest asset/content/metadata at the earliest start time based on customer order information. During runtime, processes corresponding to ingest work units 1506 and 1508 may track what has been ingested (e.g., downloaded) as well as the ingesting rate required to meet a jeopardy time (e.g., a threshold) for obtaining content. If the ingesting rate is below a target rate, work units 1506 and 1508 may generate an alarm.

Encode work unit 1512 may transform an asset from one format to another format. In transforming the asset, during runtime, encode work unit 1512 may invoke a work unit adapter that performs the actual encoding. Decode work unit 1514 may obtain an original asset from encoded data. In obtaining the original asset, decode work unit 1514 may invoke a work unit adapter that accesses a network element to performs the actual decoding. The decoded data may or may not have been encoded by encode work unit 1512.

Ad marker work unit 1516 may insert advertisement breaks in a media/content. The inserted breaks may include, for example, digital cue tones that are undetectable by viewers, digital program insertion (DPI) markers, etc. Ad marker work unit 1516 may engage engines for generating ad points (e.g., points at which ad breaks may be inserted). Such engines may operate automatically or with user assistance.

Close captioning work unit 1518 may overlay a transcript of audio on an asset. Branch work unit 1520 may send copies of metadata of an asset to multiple work units. Merge work unit 1522 may merge metadata received from multiple work units. Merge work unit 1522 may merge the multiple metadata, for example, when multiple assets are being combined (e.g., concatenated, spliced, etc.).

Transform work unit 1524 may change the format of an asset (e.g., change frame rate, aspect ratio, resolution, crop, etc.). Transformation may be efficiently performed when the source and target formats are sufficiently similar. In transforming, work unit 1524 may use parameters such as, for example: names of source and target files; video frame size; bit rate; frame rate; identity of video codec; audio bit rate; audio sample rate; audio codec; etc. One example of transforming may include changing a format of an asset originally received in an MP2 format to an AVI format.

Split media work unit 1526 may split a media stream/file into multiple streams/files. For example, split media work unit 1526 may split a media file into audio, video, and subtitles and send each to a corresponding decoder. In one implementation, split media work unit 1526 may not itself perform decoding, but stream segregated components of the file/stream to their respective decoders. In other implementations, split media work unit 1526 may split a media stream by segmenting the media stream based on either size or time (e.g., split an hour-long video into two 30 minute videos).

Distribute work unit 1528 may distribute an asset to one or more DMRs and other types of customers. In distributing assets to a particular DMR 130 or consumer 140, distribute work unit 1528 may attach, to the assets, metadata that is specified by content creator 110, DMR 130, or consumer 140. This may require the metadata of the asset to be mapped to the metadata format requested/needed by DMR 130 or consumer 140.

Distribute work unit 1528 may distribute the asset to multiple DMRs concurrently or in sequence, depending on system resource availability and a work order specification. If a network connection with DMR 130 cannot be established, distribute work unit 1528 may re-attempt to distribute to DMR 130 at a later time. Each successive attempt may trigger a wait period that exponentially increases with each trial (e.g., 1 minute, 2 minutes, 4, minutes, 8 minutes, 16 minutes, etc.). When distribute work unit 1528 has tried a particular number of times, distribute work unit 1528 may send an alarm to a DDC operator, indicating that the DMR is off-line. When the DDC operator toggles the state of DMR 130 as being on-line, distribute work unit 1528 may retry all failed distributions. This may or may not result in rescheduling processes (e.g., other distributions) waiting on availability of resources (e.g., bandwidth) allocated for the distribution.

Package work unit 1530 may assemble interrelated assets and data, including content, metadata, artwork, etc., into a single package for distribution. During packaging, package work unit 1530 may require, use, and/or output parameters such as, for example, a name of asset, an asset location (e.g., a network address or a universal resource locator (URL), etc.), a package ID, a package version, a name of metadata, a location of the metadata, etc.

In some instances, for distribution, it is convenient to bundle packages that are generated by package work unit 1530. For such cases, in some implementations, DDC 150 may include a bundling work unit, for combining a list of packages.

Encrypt work unit 1532 may encode data, via an algorithm that renders the recovery of the original data from the encoded data difficult, without using one or more keys. The encryption may secure the original data against unauthorized use. Decrypt work unit 1534 may decode encrypted data, via one or more keys, to recover the original data from which the encrypted data has been obtained. Both encrypt and decrypt work units 1532 and 1534 may allow a user to select a particular encryption/decryption profile (e.g., algorithm or parameter) from available alternatives. In some implementations, the encryption/decryption scheme may generate a root key for a chain of licenses.

Archive work unit 1536 may store data in a long-term repository. In archiving, work unit 1536 may require and/or use parameters such as, for example, an identifier associated with data being archived (e.g., name of an asset, metadata type, etc.), user ID of a user requesting the archive operation, password, etc. Save work unit 1538 may temporarily store an asset during its processing. The stored asset may be removed when the processing is complete or may be made permanent. Save work unit 1538 may require and/or use parameters such as, for example, a name of the asset/metadata being processed, a network address of the asset/metadata, a user ID, a password, etc. Retrieve work unit 1540 may retrieve stored data/asset from a particular location in a network, based on the name and location of data/asset, etc.

Quality assurance work unit 1542 may check the quality of processed data/asset, to ensure that the processed data/asset meets source (e.g., content creator 110) and target (e.g., DMR 130) requirements. For example, quality assurance work unit 1542 may determine whether processed data/asset has been transcoded correctly and is free of corruption. In another example, quality assurance work unit 1542 may check the quality of assets/content received from a source (e.g., file size, checksum, etc.). In some implementations, in addition to quality assurance work unit 1542, DDC 150 may also provide a metadata quality assurance work unit that checks for presence of particular fields, allowed values in the fields, titles, asset ID, etc.

Manual intervention work unit 1544 may assign (based on input from a manager or another user) work to human workers. In assigning the work, manual intervention work unit 1544 may send messages to the workers. Report work unit 1546 may send different types of reports to users (e.g., emails, notifications, etc.).

Assembly work unit 1548 may assemble data for generating a work order. The data may include customer-provided profiles for downloading an asset, a workflow, generic work order instructions, bill of materials (e.g., a specification setting forth a set of inputs and outputs necessary to execute a work order), etc.

Depending on the implementation, DDC 150 may provide other types of work units not in list 1500. For example, DDC 150 may include a work unit for transcoding ingested assets into a low-resolution proxy asset. For this operation, the required parameters may include, for example, a video frame size, bit rate (e.g., 1024 k), frame rate, video codec, etc. In another example, DDC 150 may include image/art work transformer work unit for changing a resolution, black filling, etc., and/or rendering other types of modifications to the image/artwork.

Additional examples of the other types of work units include work units for publication of content, allowing manual handling of metadata and/or content, adapting ad markers, transforming artwork and images, inserting logos, ads or black space into content, allowing manual assembly, allowing manual packaging, checking time code, bundling packages, audio leveling, layering content, and concatenating content.

In the foregoing description, DDC 150 may allow a user to define work units and use the work units for composing workflows, to dynamically provide for customer-requested processes for content distribution. When the user submits an order on behalf of a customer, the DDC may obtain, from the workflow associated with the order, tasks that correspond to the work units. Furthermore, the DDC may perform each of the tasks.

In servicing the customer, the user may sometimes encounter situations in which the user repeatedly submits, given different input content, the same workflow with the same parameters for service orders. To facilitate handling such service orders, DDC may allow the user to create SKU specifications. When the user receives a service order whose content processing is designated by a SKU, the user may select the SKU and submit the SKU for the service order. When DDC 150 receives the service order with the SKU from the user, DDC 150 may resolve the SKU into a set of tasks and parameters that are associated with work units. Subsequently, DDC 150 may perform the tasks. In the preceding, the SKUs may spare the user from inputting and/or selecting parameter values.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to an exemplary process illustrated in FIG. 4, the order of the blocks may be modified in other implementations. In addition, non-dependent blocks may represent acts that can be performed in parallel to other blocks. Furthermore, process 400 may include additional, fewer, or different blocks than those illustrated in FIG. 4.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
a workflow manager configured to:
obtain a workflow identifier based on user input,
identify a workflow that includes work units based on the workflow identifier, wherein the work units define processing of one or more of video content, metadata for the video content, audio content, and metadata for the audio content, and wherein the work units and workflow do not include a source transport profile and a destination transport profile,
select, based on the user input, a preset from a plurality of existing presets, wherein each of the presets includes values that are assignable to parameters of the work units,
assign the selected preset to the parameters of the work units,
create a stock keeping unit specification that associates the work units and the selected preset, wherein the stock keeping unit specification includes a stock keeping unit specification identifier that uniquely identifies the stock keeping unit specification among a plurality of different stock keeping unit specifications;
work order components configured to:
receive a work order associated with the stock keeping unit specification, and
for each of the work units of the stock keeping unit specification, instantiate a task; and
a command processor configured to execute, for each of the tasks, a corresponding work unit process,
wherein a number of the work units is equal to a number of the tasks, and
wherein the workflow manager is further configured to:
update, in a database, a stock keeping unit specification table and a stock keeping unit digital management retailer account association table,
wherein the stock keeping unit specification table includes the stock keeping unit specification identifier, an account identifier of a digital media retailer, and a status flag that indicates whether a stock keeping unit specification identified by the stock keeping unit specification identifier is being tested, and
wherein stock keeping unit digital management retailer account association table includes the stock keeping unit specification identifier included in the stock keeping unit specification table, the identifier of the digital media retailer, and an identifier assigned by the system to digital management retailers to which processed content is to be distributed by the work processes executed by the command processor.

2. The system of claim 1, wherein the work order comprises at least:
a transport profile.

3. The system of claim 2, wherein the transport profile includes at least one of:
a user identifier (ID) and password, a network address of a location from which input content is to be obtained, or a protocol.

4. The system of claim 3, wherein the workflow manager includes interfaces configured to:
create a transport profile, delete a transport profile, or update a transport profile.

5. The system of claim 1, wherein the workflow manager includes interfaces configured to:
create a stock keeping unit specification;
delete a stock keeping unit specification; or
obtain a list of stock keeping unit specifications.

6. The system of claim 1, wherein the stock keeping unit specification includes:
identifiers for one or more operations, each operation corresponding to a work unit.

7. The system of claim 1, wherein the workflow manager includes interfaces configured to:
create a transport profile, update a transport profile, or delete a transport profile.

8. The system of claim 1, further comprising one or more databases, the one or more databases including:
a table that associates parameters with the preset; and
a table that associates an operation with the stock keeping unit specification identifier.

9. The system of claim 8, wherein the stock keeping unit specification identifies a work unit for ingesting, transforming, or packaging audio or video content.

10. The system of claim 9, wherein the work unit for transforming is configured to:

insert black space in the video content, insert a bug in the video content, insert an advertisement in the video content, encrypt the video content, or decrypt the video content.

11. The system of claim 9, wherein the work unit for ingesting is further configured to:
ingest metadata for audio or video content.

12. The system of claim 1, further comprising service operation management components configured to receive one of:
an order that includes a stock keeping unit specification and a transport profile; or
an order that specifies a workflow and parameters associated with the workflow.

13. A method comprising:
creating a workflow that includes work units, wherein the work units define processing of one or more of video content, metadata for the video content, audio content, and metadata for the audio content, and wherein the work units and workflow do not include a source transport profile and a destination transport profile;
selecting, based on user input, a preset from a plurality of existing presets, wherein each of the presets includes values that are assignable to parameters of the work units;
assigning the selected preset to the parameters of the work units;
creating a stock keeping unit specification that associates the work units and the selected preset, wherein the stock keeping unit specification includes a stock keeping unit specification identifier that uniquely identifies the stock keeping unit specification among a plurality of stock keeping unit specifications;
receiving the stock keeping unit specification identifier;
generating a work order associated with the stock keeping unit specification, based on the stock keeping unit specification identifier,
converting the stock keeping unit specification into the work units based on the work order;
for each of the work units of the stock keeping unit specification, instantiating a task; and
executing the tasks by one or more processors,
updating, in a database, a stock keeping unit specification table and a stock keeping unit digital management retailer account association table;
wherein a number of the work units of the stock keeping unit specification is equal to a number of the instantiated tasks,
wherein the stock keeping unit specification table includes the stock keeping unit specification identifier, an account identifier of a digital media retailer, and a status flag that indicates whether a stock keeping unit specification identified by the stock keeping unit specification identifier is being tested, and
wherein stock keeping unit digital management retailer account association table includes the stock keeping unit specification identifier included in the stock keeping unit specification table, the identifier of the digital media retailer, and an identifier assigned to digital management retailers to which processed content is to be distributed.

14. The method of claim 13, further comprising:
submitting the work order, wherein generating the work order includes:
selecting the stock keeping unit specification and a transport profile.

15. The method of claim 14, wherein selecting the transport profile includes:
selecting information that includes a network address from which input video or audio content is to be retrieved.

16. The method of claim 13, further comprising:
associating a different preset with the work units.

17. The method of claim 13, wherein executing the tasks includes transcoding the video content.

18. At least one non-transitory computer-readable storage device, comprising computer-executable instructions for execution by at least one processor, the instructions causing the at least one processor to:
compose a workflow that includes work units, wherein the work units define processing of one or more of video content, metadata for the video content, audio content, and metadata for the audio content, and wherein the work units and workflow do not include a source transport profile and a destination transport profile;
select, based on user input, a preset from a plurality of existing presets, wherein each of the presets includes values that are assignable to parameters of the work units;
assign the selected preset to the parameters of the work units;
create a stock keeping unit specification that associates the work units and the selected preset, wherein the stock keeping unit specification includes a stock keeping unit specification identifier that uniquely identifies the stock keeping unit specification among a plurality of stock keeping unit specifications;
submit a work order that identifies the stock keeping unit specification and a transport profile;
for each of the work units of the stock keeping unit specification, instantiating a task based on the work order;
execute the tasks; and
update, in a database, a stock keeping unit specification table and a stock keeping unit digital management retailer account association table,
wherein a number of the work units of the stock keeping unit specification is equal to a number of the instantiated tasks,
wherein a number of the work units of the stock keeping unit specification is equal to a number of the instantiated tasks,
wherein the stock keeping unit specification table includes the stock keeping unit specification identifier, an account identifier of a digital media retailer, and a status flag that indicates whether a stock keeping unit specification identified by the stock keeping unit specification identifier is being tested, and
wherein stock keeping unit digital management retailer account association table includes the stock keeping unit specification identifier included in the stock keeping unit specification table, the identifier of the digital media retailer, and an identifier assigned to digital management retailers to which processed content is to be distributed.

19. The at least one non-transitory computer-readable storage device of claim 18, wherein the instructions for causing the at least one processor to execute the tasks include instructions for causing the at least one processors to transcode a video file.

20. The at least one non-transitory computer-readable storage device of claim 18, wherein the work order comprises at least a transport profile.

* * * * *